(12) United States Patent
Leister et al.

(10) Patent No.: US 9,943,801 B2
(45) Date of Patent: Apr. 17, 2018

(54) OPTIMIZATION OF STRIPPER FEED CONFIGURATION FOR RICH/LEAN SOLVENT REGENERATION

(71) Applicant: Dow Global Technologies LLC, Midland, MI (US)

(72) Inventors: Jonathan W. Leister, Manvel, TX (US); Ross E. Dugas, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/905,531

(22) PCT Filed: Sep. 11, 2014

(86) PCT No.: PCT/US2014/055103
§ 371 (c)(1),
(2) Date: Jan. 15, 2016

(87) PCT Pub. No.: WO2015/041914
PCT Pub. Date: Mar. 26, 2015

(65) Prior Publication Data
US 2016/0193560 A1 Jul. 7, 2016

Related U.S. Application Data

(60) Provisional application No. 61/879,788, filed on Sep. 19, 2013.

(51) Int. Cl.
*B01D 53/14* (2006.01)

(52) U.S. Cl.
CPC .. *B01D 53/1425* (2013.01); *B01D 2252/2021* (2013.01); *B01D 2252/2025* (2013.01); *B01D 2252/2026* (2013.01); *B01D 2252/20421* (2013.01); *B01D 2252/20426* (2013.01); *B01D 2252/20431* (2013.01); *B01D 2252/20447* (2013.01); *B01D 2252/20452* (2013.01); *B01D 2252/20468* (2013.01); *B01D 2252/20484* (2013.01); *B01D 2252/20489* (2013.01); *B01D 2256/245* (2013.01); *B01D 2257/108* (2013.01); *B01D 2257/302* (2013.01); *B01D 2257/304* (2013.01); *B01D 2257/306* (2013.01);
(Continued)

(58) Field of Classification Search
CPC ........ B01D 2252/103; B01D 2252/204; B01D 2258/0283; B01D 53/1425; B01D 53/1475; B01D 53/1493; B01D 53/18; B01D 53/62; B01D 53/78; C01B 31/20; Y02C 10/04; Y02C 10/06; Y02P 20/152
See application file for complete search history.

(56) References Cited

U.S. PATENT DOCUMENTS

| | | | | |
|---|---|---|---|---|
| 4,106,916 A | * | 8/1978 | Tuckett | B01D 53/14 196/132 |
| 2008/0236114 A1 | * | 10/2008 | Zhang | B01D 53/04 55/385.1 |

(Continued)

*Primary Examiner* — Cabrena Holecek (57) ABSTRACT

Disclosed is an improved process for regenerating solvent used to remove contaminants from a fluid stream. Said process comprises a solvent regeneration system (10) comprising a rich/lean solvent stripper column (29), reboiler (50), condenser (36), and reflux receiver (38) wherein the improvement is the location 46 of the condensed stripper gas return from the reflux receiver.

9 Claims, 3 Drawing Sheets

(52) U.S. Cl.
CPC .. *B01D 2257/308* (2013.01); *B01D 2257/406* (2013.01); *B01D 2257/408* (2013.01); *B01D 2257/502* (2013.01); *B01D 2257/504* (2013.01); *B01D 2257/702* (2013.01)

(56) References Cited

U.S. PATENT DOCUMENTS

2011/0120309 A1* 5/2011 Baburao ............ B01D 53/1412
    95/199
2012/0260801 A1* 10/2012 Iijima ................ B01D 53/1475
    95/174

* cited by examiner

OPTIMIZATION OF STRIPPER FEED CONFIGURATION FOR RICH/LEAN SOLVENT REGENERATION

FIELD OF THE INVENTION

The present invention relates to an improved process for regenerating solvent used to remove contaminants from a fluid stream, for example a natural gas stream. Said process comprises a solvent regeneration system comprising a rich/lean solvent stripper column, reboiler, condenser, and reflux receiver wherein the improvement is the feed location of the condensed stripper gas return.

BACKGROUND OF THE INVENTION

Fluid streams derived from natural gas reservoirs, petroleum or coal, often contain a significant amount of acid gases, for example carbon dioxide, hydrogen sulfide, sulfur dioxide, carbon disulfide, carbonyl sulfide, hydrogen cyanide, ammonia, or mercaptans as impurities. Said fluid streams may be gas, liquid, or mixtures thereof, for example gases such as natural gas, refinery gas, hydrocarbon gasses from shale pyrolysis, synthesis gas, and the like or liquids such as liquefied petroleum gas (LPG) and natural gas liquids (NGL). Various compositions and processes for removal of acid gas contaminants are known and described in the literature.

Acid gas removal from gas streams, particularly removal of hydrogen sulfide and carbon dioxide from gas streams formed in refinery process units, synthesis gas production plants and oil and gas production facilities, is necessary to allow this gas to be used and/or sold into pipeline systems. The removal of sulfur compounds from these acid gasses or "sour gasses" is called "sweetening."

Typically, acid gases are removed using a solvent to remove the acid gas via the production of a rich solvent. For example, it is well-known to treat such fluid streams with chemical solvents, such as amine solutions, which rely on a chemical reaction between the solvent and acid gas contaminants. The amine usually contacts the acidic gas contaminants in the fluid stream as an aqueous solution containing the amine in an absorber tower with the aqueous amine solution contacting the fluid stream counter currently. The regeneration of chemical solvents is achieved by the application of heat.

Alternatively, fluid streams may be treated with physical solvents, such as refrigerated methanol, dialkyl ethers of polyethylene glycols (DEPG), N-methyl-2-pyrrolidones (NMP), propylene carbonate, and the like which do not react chemically with the acid gas impurities. Physical solvents dissolve (absorb) the acid gas contaminants from the fluid stream, typically under high pressure. Since no chemical reactions are involved, physical solvent processes usually require less energy than chemical solvent processes. While the regeneration of chemical solvents is achieved by the application of heat, physical solvents can be stripped of impurities by reducing the pressure without the application of heat. Physical solvents tend to be favored over chemical solvents when the concentration of acid gases or other impurities is very high. Unlike chemical solvents, physical solvents are non-corrosive, requiring only carbon steel construction.

Acid gas contaminants are removed by contacting the contaminated product gas with fresh solvent in an absorber or other specialized equipment operated under conditions of high pressure and/or low temperature which are favorable for the type of solvent used. Once the contaminants are removed, the decontaminated gas is ready for sale, for use, or for additional downstream conditioning, depending on the product stream specifications. The solvent is regenerated for reuse by driving off the absorbed contaminants under low pressure and/or high temperature conditions favorable for desorption. Flash tanks and/or stripper columns are typically used to effect this separation.

While numerous prior art processes and systems for acid gas absorption and solvent regeneration are known in the art, many suffer from one or more disadvantage or inefficiency. There is an ever-existing desire to further improve these technologies, e.g., in respect of purification and energy consumption.

SUMMARY OF THE INVENTION

An object of the present invention is to improve conventional solvent regeneration technology for use in processing fluid streams.

In one embodiment the present invention is a plant for treating a fluid stream comprising a solvent regeneration stage wherein rich solvent comprising one or more contaminant absorbed from the fluid stream is regenerated into lean solvent by stripping away the contaminants said regeneration stage comprises:

i a stripper column having a top and a bottom and comprising at least one vapor-liquid contacting section, wherein rich solvent comprising contaminants is fed into the stripper column at a location at or above the at least one upper vapor-liquid contacting section;
  ii a reboiler operationally coupled to the bottom of the stripper column to receive and heat the lean solvent to produce condensable stripping gas which is fed back into the stripper column;
  iii a condenser for condensing condensable stripping gas to condensed stripping gas operationally coupled to the top of the stripper column; and
  iv a reflux receiver to collect condensed stripping gas operationally coupled to the condenser and the stripper column wherein the collected condensed stripper gas is returned into the stripper column at a location:
    a below the feed location of the rich solvent with at least a portion of the vapor-liquid contacting section between the rich feed location and the condensed stripper gas return location and
    b above the condensable stripping gas return location from the reboiler.

Another embodiment the present invention is a plant for treating a fluid stream comprising a solvent regeneration stage wherein rich solvent comprising one or more contaminate absorbed from the fluid stream is regenerated into lean solvent by stripping away the contaminants, said regeneration stage comprises:

i a stripper column having a top and a bottom and comprising at least two sections, an upper section and a lower section wherein rich solvent comprising contaminants enters the stripper column at a location at or above the upper section;
  ii a reboiler operationally coupled to the bottom of the stripper column to receive and heat the lean solvent to produce condensable stripping gas which is fed back into the stripper column;
  iii a condenser for condensing condensable stripping gas to condensed stripping gas operationally coupled to the top of the stripper column; and iv a reflux receiver to collect the condensed stripping gas operationally coupled to the condenser and the stripper column wherein the collected condensed stripping gas is introduced into the stripper column at a location below the upper section and above the condensable stripping gas return location from the reboiler.

Another embodiment of the present invention is a method for treating a fluid stream wherein rich solvent comprising one or more contaminant absorbed from the fluid stream is regenerated into lean solvent by stripping away the contaminants comprising the steps of:

i providing an input stream of rich solvent comprising contaminants to a stripper column having a top and a bottom and comprising at least one vapor-liquid contacting section, wherein rich solvent is fed into the stripper column at a location at or above the at least one vapor-liquid contacting section;

ii stripping contaminants from the rich solvent by contacting the rich solvent with condensable stripping gas in the stripper column to release the contaminants and form a lean solvent and an overhead admixture of condensable stripping gas and contaminants;

iii feeding said lean solvent to a reboiler here it is heated to produce additional condensable stripping gas;

iv introducing said additional condensable stripping gas to the stripper column at a return location whereby it contacts rich solvent comprising contaminants and exits the top of the stripper column as the overhead admixture of condensable stripping gas and contaminants;

v recovering condensed stripper gas from the overhead admixture by passage thereof through a condenser which condenses the condensable stripping gas to condensed stripping gas;

vi collecting said recovered condensed stripper gas in a reflux receiver for subsequent return to the stripper column;

vii introducing at least a portion of said recovered condensed stripper gas to the stripper column at a return location which is:
  a below the feed location of the rich solvent with at least a portion of the vapor-liquid contacting section between the rich feed location and the condensed stripper gas return location and
  b above the condensable stripping gas return location from the reboiler; and viii passing the lean solvent from the reboiler as regenerated lean solvent.

Another embodiment of the present invention is a method for treating a fluid stream wherein rich solvent comprising one or more contaminant absorbed from the fluid stream is regenerated into lean solvent by stripping away the contaminants comprising the steps of:

i providing an input stream of rich solvent comprising contaminants to a stripper column having a top and a bottom and comprising at least two sections, an upper section and a lower section wherein rich solvent enters the stripper column at a location at or above the upper section;

ii stripping contaminants from the rich solvent by contacting the rich solvent with condensable stripping gas in the stripper column to release the contaminants and form a lean solvent and an overhead admixture of condensable stripping gas and contaminants;

iii feeding said lean solvent to a reboiler here it is heated to produce additional condensable stripping gas;

iv introducing said additional condensable stripping gas to the stripper column whereby it contacts rich solvent comprising contaminants and exits the top of the stripper column as the overhead admixture of condensable stripping gas and contaminants;

v recovering condensed stripper gas from the overhead admixture by passage thereof through a condenser which condensing condensable stripping gas to condensed stripper gas;

vi collecting said recovered condensed stripper gas in a reflux receiver for subsequent return to the stripper column;

vii introducing said recovered condensed stripper gas to the stripper column at a location below the upper section and above the condensable stripping gas return location from the reboiler; and iv passing the lean solvent from the reboiler as regenerated lean solvent.

In a preferred embodiment of the process described herein above the fluid stream is produced by a gassifier or syngas stream comprising hydrogen, carbon dioxide, and carbon monoxide.

Another preferred embodiment of the process described herein above the fluid stream is derived from natural gas and is a gas, a liquid, or mixtures thereof.

Another preferred embodiment of the process described herein above the contaminants include one or more ethane, propane, butanes, pentanes, heavier hydrocarbons, hydrogen, water, carbon monoxide, nitrogen, carbon dioxide, hydrogen sulfide, sulfur dioxide, carbon disulfide, ammonia, hydrogen cyanide, carbonyl sulfide, or mercaptans.

Another preferred embodiment of the process described herein above the solvent is a chemical or physical solvent, the physical solvent is preferably dimethyl ether of polyethylene glycol; propylene carbonate; N-methyl-2-pyrrolidone; methanol; N-acetylmorpholine; N-formylmorpholine; 1,3-dimethyl-3,4,5,6-tetrahydro-2(1H)-pyrimidinone; methoxytriglycol; or blends thereof.

DETAILED DESCRIPTION OF THE INVENTION

Figure 1:
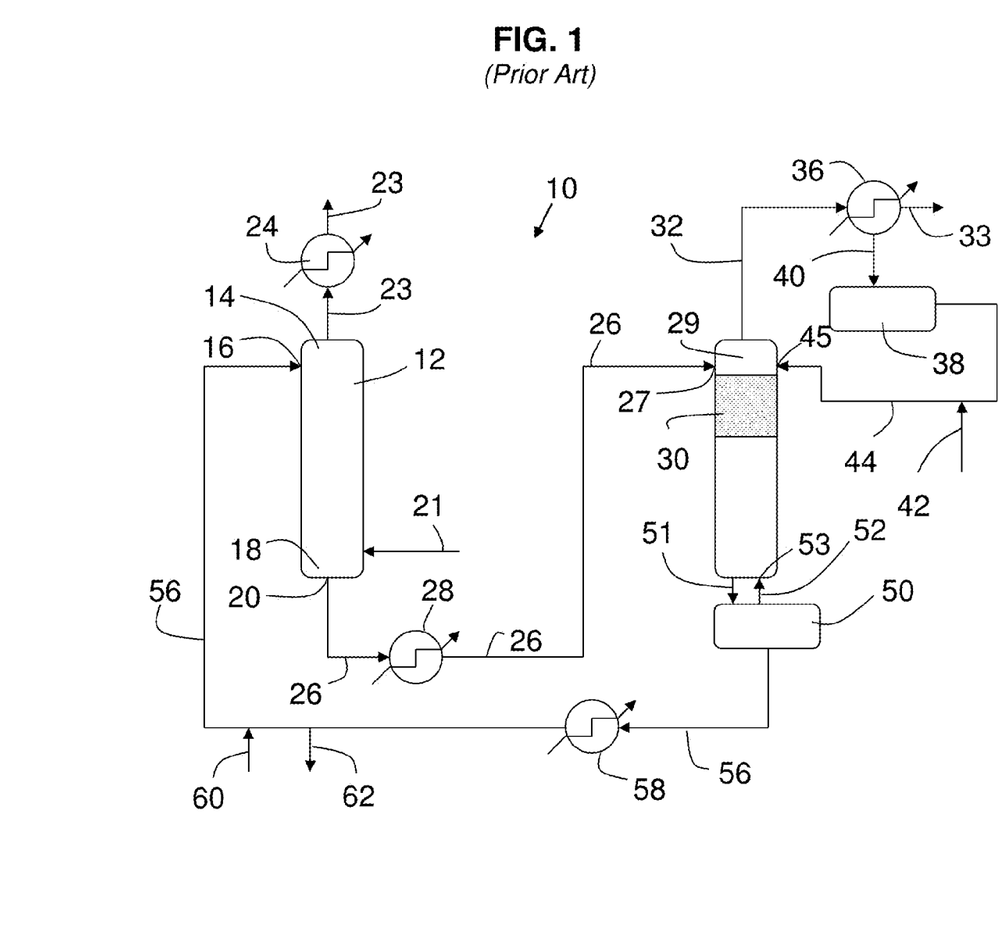
FIG. 1 is a schematic of a process for treating a fluid stream comprising a regeneration stage of a known configuration.

A conventional solvent process for removing contaminants from a fluid stream is shown in FIG. 1; the solvent regeneration generally takes place in a stripper column with a reboiler at the bottom to furnish heat to the solvent. The stripper column is generally a tower designed to create efficient gas/liquid contact containing either trays or packing. The rich solvent containing the contaminants, for example sour gasses (such as $CO_2$ and $H_2S$) is injected into the stripper column typically at or near a location near the top and flows down the tower while a vaporized condensable stripping gas, for example steam, generated in the reboiler flows up the tower countercurrent to the descending rich solvent. The condensable stripping gas aids in "stripping"

the contaminants from the rich solvent liquid and sends them back up the tower and out the top of the stripper column. The heat added to the stripper reboiler increases the temperature of the solvent somewhat, but most of the heat goes into vaporizing the condensable stripping gas which, in turn, flows into and up the stripper column. This heat added or inputted into the reboiler must be furnished from an outside source such as steam from another process, heat transfer media circulated through the reboiler, or directly fired into the reboiler. When contaminants, as gas and/or vapor, pass out the top of the stripper column, a large amount of condensable stripping gas also goes out as an admixture with the contaminants. This overhead condensable stripping gas and gas/vapor stream (called overhead) can be higher in temperature than the feed to the top of the stripper column. The gasses and condensable stripping gas which flow from the top of the stripper flow to a condenser (called a reflux condenser) where the contaminants are cooled to near ambient temperatures and most of the condensable stripping gas condenses into a condensed stripper gas, for example water. In the traditional solvent unit, this condensed stripper gas is separated via the reflux receiver and is returned near the top of the stripper. Depending on the make-up of the contaminant gasses/vapors they may be disposed of, separated, captured, and/or further treated.

Fluid streams treatable by the process of the present invention may be a gas, a liquid, or mixtures thereof, for example gases produced by a gassifier comprising hydrogen, carbon dioxide, and carbon monoxide; a syngas stream comprising hydrogen, carbon dioxide, and carbon monoxide; natural gas; refinery gas; hydrocarbon gasses from shale pyrolysis; synthesis gas; and liquids such as liquefied petroleum gas (LPG) and natural gas liquids (NGL). For example, fluid streams derived from natural gas reservoirs, petroleum, or coal, comprise methane ($CH_4$) and commonly exist in mixtures with other hydrocarbons, principally ethane ($C_2H_6$), propane ($C_3H_8$), butanes ($C_4H_{10}$), pentanes ($C_5H_{12}$), and to a lesser extent, heavier hydrocarbons. Such fluid streams comprise a variety of impurities such as hydrogen ($H_2$), water ($H_2O$), carbon monoxide (CO), nitrogen ($N_2$), and acid gasses, for example carbon dioxide ($CO_2$), hydrogen sulfide ($H_2S$), sulfur dioxide ($SO_2$), carbon disulfide ($CS_2$), ammonia ($NH_3$), hydrogen cyanide (HCN), carbonyl sulfide (COS), and/or mercaptans. In one embodiment, the term "contaminant" refers generally to one or more of $C_2$ or heavier hydrocarbons, impurities, acid gasses, and mixtures thereof to be removed from a fluid stream.

Suitable solvents useful in the process of the present invention may remove one or more of the above listed contaminants from the fluid stream. Solvents may be non-selective, i.e., remove one or more heavier hydrocarbon/impurity/acid gas or selective, i.e., they may target specific heavier hydrocarbons/impurities/acid gas(es). Depending on the targeted heavier hydrocarbon and/or impurity and/or acid gas to be removed the solvent for use in the process of the present invention may be a chemical solvent such as an amino compound or a physical solvent.

Typically, a solvent suitable for use in the present invention comprises a condensed stripping solvent, for example water, that when heated the condensed stripping solvent vaporizes to become a condensable stripping gas, in the case for water it becomes steam. Preferably the amount of condensed stripping gas (in liquid form) is present in the solvent in an amount of equal to or less than 75 mole percent, preferably equal to or less than 50 mole percent, more preferably equal to or less than 30 mole percent. Preferably the amount of condensed stripping gas (in liquid form) is present in the solvent in an amount of equal to or greater than 1 mole percent, more preferably equal to or greater than 5 mole percent and more preferably equal to or greater than 10 mole percent.

Suitable amino compounds include, but are not limited to, monoethanolamine, methylethanolamine, monoisopropanolamine, diisopropanolamine, 2-hydroxyethylpiperazine, piperazine, 1-methylpiperazine, 2-methylpiperazine, 2-(2-aminoethoxy) ethanol; 2-(2-tertiarybutylamino)propoxyethanol, 2-(2-tertiarybutylamino)ethoxyethanol, 2-(2-isopropylamino)propoxyethanol, tertiaryamylaminoethoxyethanol, (1-methyl-2-ethylpropylamino)ethoxyethanol; tris(2-hydroxyethyl)amine (triethanolamine, TEA); tris(2-hydroxypropyl)amine (triisopropanol); tributanolamine; bis(2-hydroxyethyl)methylamine (methyldiethanolamine, MDEA); 2-diethylaminoethanol (diethylethanolamine, DEEA); 2-dimethylaminoethanol (dimethylethanolamine, DMEA); 3-dimethylamino-1-propanol; 3-diethylamino-1-propanol; 2-diisopropylaminoethanol (DIEA); N,N'-bis(2-hydroxypropyl)methylamine (methyldiisopropanolamine, MDIPA); N,N'-bis(2-hydroxyethyl)piperazine (dihydroxyethylpiperazine, DiHEP)); diethanolamine (DEA); 2-(tert-butylamino)ethanol; 2-(tert-butylaminoethoxy)ethanol; 1-amino-2-methylpropan-2-ol; 2-amino-2-methyl-1-propanol (AMP), 2-(2-aminoethoxy) ethanol, and blends thereof.

Suitable amino compounds may be selected from a primary amine, a secondary amine, a tertiary amine, or blends thereof.

Preferably, the solvent used in the process of the present invention is a physical solvent. Suitable physical solvents include, but are not limited to, dimethyl ether of polyethylene glycol (DMPEG), propylene carbonate (PC), N-methyl-2-pyrrolidone (NMP), methanol (MeOH), blends of N-acetylmorpholine and N-formylmorpholine, 1,3-dimethyl-3,4,5,6-tetrahydro-2(1H)-pyrimidinone (DMTP), methoxytriglycol (MTG), and blends thereof.

DMPEG is a mixture of dimethyl ethers of polyethylene glycol ($CH_3O(C_2H_4O)_nCH_3$ (n is from 2 to 9) used in what is referred to as the SELEXOL™ process to physically absorb $H_2S$, $CO_2$, and mercaptans from gas streams, for example see U.S. Pat. No. 6,203,599 which is incorporated herein in its entirety. Solvents containing DMPEG are licensed and/or manufactured by several companies including Coastal Chemical Company (as COASTAL™ AGR) and Dow (SELEXOL). Other process suppliers such as Clariant GmbH of Germany offer similar solvents. Clariant solvents are a family of dialkyl ethers of polyethylene glycol under the GENOSORB™. DMPEG can be used for selective $H_2S$ removal which requires stripping, vacuum stripping, or a reboiler.

A physical solvent acid gas removal process is based on the solubility of the acid gases, for example $CO_2$, $H_2S$, $SO_2$, $CS_2$, COS, HCN, $NH_3$, mercaptans and the like, within the solvent, instead of on chemical reactions between the acid gas and the solvent. Solubility depends primarily on partial pressure and secondarily on temperature. Higher acid-gas partial pressures and lower temperatures increase the solubility of $H_2S$, $CO_2$, etc. in the solvent and thus decrease the acid-gas components. Various organic solvents are used to absorb the acid gases. Regeneration of the solvent is accomplished by flashing to lower pressures and/or stripping with solvent vapor or a condensable stripping gas, such as steam. Some solvents can be regenerated by flashing only and require no heat. Other solvents require stripping and some heat, but typically the heat requirements are small compared to chemical solvents.

The simplest version of a physical solvent process involves absorption followed by regeneration of the solvent by flashing to atmospheric pressure or vacuum, or by inert gas stripping. If $H_2S$ is present at only very low concentrations or is entirely absent, this flow scheme is usually applicable since $CO_2$ concentrations as high as 2 or 3 percent can often be tolerated in the product gas. When $H_2S$ is present in significant amounts, thermal regeneration is usually necessary to accomplish the thorough stripping of the solvent needed to reach stringent $H_2S$ purity requirements. Some physical solvents, such as propylene carbonate, cannot be thermally regenerated since they are unstable at the high temperature required to completely strip $H_2S$ from the rich solvent. Heat requirements are usually much less for physical solvents than for chemical solvents such as amines since the heat of desorption of the acid gas for the physical solvent is only a fraction of that for chemical solvents. The circulation rate of the physical solvent may also be less, particularly when the acid gas partial pressure is high.

FIG. 1 illustrates a conventional fluid stream treatment process including a single purification unit 12 in which a solvent is used to contact and purify the contaminated fluid. In other modes of practice, the purification stage may include a plurality of treatments units in which this purifying action takes place. The multiple units may be the same or different. In other embodiments, membranes may be used in addition to absorbing units and/or as an alternative to scrubbing units.

In many instances, the contact between the solvent and the contaminated fluid occurs in unit 12 in counter-current fashion as shown in FIG. 1. The lean solvent enters the first purification unit 12 at a upper end 14 via inlet 16. After having absorbed contaminants from the fluid being treated, the resultant rich solvent exits the first purification unit 12 at a lower end 18 via an outlet 20. The contaminated fluid moves through unit 12 in the opposite direction. Via pathway 21, the contaminated fluid enters the first purification unit 12 at lower end 18 and exits in more pure form from upper end 14 via pathway 23. When the purified fluid is a gas, the purified gas might entrain vaporized solvent, water vapor, or the like. It may be desirable to separate the purified gas from such entrained components. Consequently, the purified gas may be directed to an optional condenser 24, where the vaporized solvent or water vapor exiting the unit 12 is condensed.

As used herein, the term "lean" with respect to a solvent shall mean that the concentration of contaminants in the solvent is sufficiently low such that mass transfer of contaminant from the fluid being treated to the solvent will occur when the solvent and contaminated fluid are contacted. In one embodiment, a lean solvent includes a regenerated amine solution that has been treated to remove contaminant content from a rich amine solution, optionally fresh solvent introduced to the system that has not yet been used for purification, and/or a combination of these. In another embodiment, a lean solvent includes a regenerated solvent that has been treated to remove contaminant content from a rich solvent, optionally fresh solvent introduced to the system that has not yet been used for purification, and/or a combination of these. "Fresh solvent" shall refer to a solvent that is being introduced into the treatment system 10 for the first time from a suitable source. Fresh solvent also is lean with respect to contaminants. The term "rich" with respect to a solvent shall refer to a solvent that has picked up contaminants relative to the lean solvent during the course of a purification treatment.

After the rich solvent exits the first purification unit 12, it is desirable to regenerate the solvent so that the solvent can be recycled back to the first purification unit 12 for more cycle(s) of treatment. Accordingly, a first pathway 26 is used to convey the rich solvent to a heating unit 28, where the solvent is heated to an appropriate temperature before being introduced to a regeneration stage in which lean solvent is regenerated from the rich solvent. For purposes of illustration, FIG. 1 shows a regeneration stage that includes as a first portion a single stripper column 29 having a top and a bottom and comprising at least one section of vapor-liquid contacting device(s) 30, sometimes referred to as stage(s) and a corresponding reboiler 50. In a traditional stripper column 29 the rich solvent typically enters towards the top of the column at a location 27 which is equal to or lower than the location of the condensed stripper gas return 45 from the reflux receiver 38.

As used herein, and with respect to a column, the terms "upper" and "lower" should be understood as relative to each other. For example, withdrawal or addition of a stream from an upper portion of a column means that the withdrawal or addition is at a higher position (relative to the ground when the column is in operation) than a stream withdrawn or added from a lower region of the same column. Viewed from another perspective, the term upper may thus refer to the upper half of a column, whereas the term lower may refer to the lower half of a column. Similarly, where the term "middle" is used, it is to be understood that a middle portion of the column is intermediate to an upper portion and a lower portion. However, where upper, middle, and lower are used to refer to a column, it should not be understood that such column is strictly divided into thirds by these terms.

In other embodiments of the prior art and the present invention, the stripper column 29 may comprise as many vapor-liquid contacting sections as needed to provide lean solvent, for example as many as 1 to 20 sections or more (2 to 20 section not depicted in FIG. 1), in other words the stripper column may comprise 1, 2, 3, 4, 5, 6, 7, 8, 9, 10, 11, 12, 13, 14, 15, 16, 17, 18, 19, 20, or more sections. Each vapor-liquid contacting section may comprise mass transfer devises, such as packing or trays, to facilitate the desorption of the contaminants.

As used herein, with respect to vapor-liquid contacting sections, the term portion of a section should be understood to mean that there may be a location within the section wherein some part or fraction of the section is above that location and some part or fraction of the section is below that location.

In other modes of practice of the prior art and the present invention, the first portion of the regeneration stage may include a plurality of stripper units with at least two sections and/or reboiler units in which corresponding regeneration action takes place. The multiple units may be the same or different. In addition to the stripper column 29, other kinds of regeneration equipment can be used to help regenerate lean solvent if desired. For instance, flash tanks (not shown in FIG. 1) could be used in combination with the stripper column 29.

As shown in FIG. 1, first pathway 26 is used to convey the rich solvent from heater 28 to the upper portion, at or above the first section 30, of stripper column 29 at an inlet position 27. The solvent then is treated in stripper column 29 by contacting the solvent with condensable stripping gas to heat the solvent. Generally, the solubility of dissolved contaminants, such as acid gases, tends to decrease as the temperature of the solvent increases. Thus, heating the solvent with the condensable stripping gas in the stripper column 29 as the solvent moves from the top of the column to the bottom of the column strips away contaminants to provide a solvent that is more lean with respect to these contaminants.

Stripped contaminants exit the top of the stripper column 29 via line 32 with the condensable stripper gas (for example steam) as an admixture of contaminants, steam and possibly solvent. The admixture is directed to a condenser 36. In condenser 36, solvent, condensed stripper gas (for example condensed water vapor), and other compounds that may leave the top the stripper column 29 together with stripped contaminants are condensed. The stripped contaminants are discharged from the condenser to line 33 for further downstream processing or disposal as desired. Condensed stripping gas, e.g., water vapor, and/or solvent and other compounds that may have condensed are passed to a reflux receiver 38 via line 40. Line 42 provides a convenient route to introduce fresh water into system 10. Condensed stripping gas, e.g., water vapor is returned via line 44 to the upper portion of the stripper column 29 at or above the same location of the rich feed, from the reflux receiver 38 at the return position 45 and is used to aid in stripping the contaminants from the solvent being regenerated.

Solvent leaving the bottom of the stripper column through line 51 passes to a reboiler 50 which is connected back to the stripper column by return line 52 and reenters the stripper column at location 53. The solvent circulating through the reboiler 50 is heated to produce additional steam which is feed back into the stripper column 29. Solvent will have an extended residence time in these units 29 and 50 until a portion of the solvent exits reboiler 50 via line 56 to be returned to first purification unit 12.

A cooling unit 58 is incorporated into line 56 to cool the lean solvent prior to the solvent being introduced to the purification unit 12 via inlet 16. In many instances, cooling unit 58 and heater 28 can also be the same piece of equipment (not shown), e.g., a cross-exchanger. Using a cross-exchanger approach, the hot solvent leaving reboiler 50 via line 56 heats up the solvent being transported to the stripper column 29 via line 26, while the relatively cooler solvent being conveyed to the stripper column 29 in line 26 cools the relatively hot solvent leaving reboiler 50 in line 56. Optionally, line 60 provides a convenient location to introduce fresh solvent to system 10. Solvent may be drained from system 10 via drain line 62.

Figure 2:
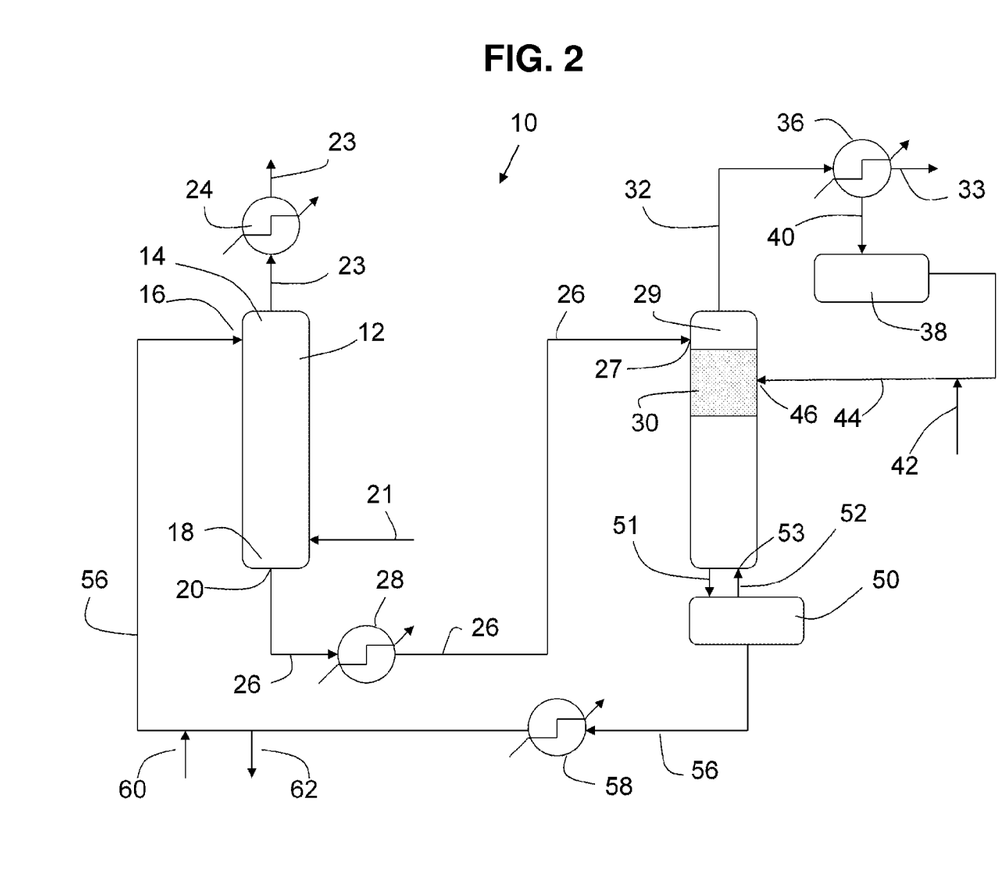
FIG. 2 is a schematic of an embodiment of a process for treating a fluid stream comprising a regeneration stage according to the present invention.
Figure 3:
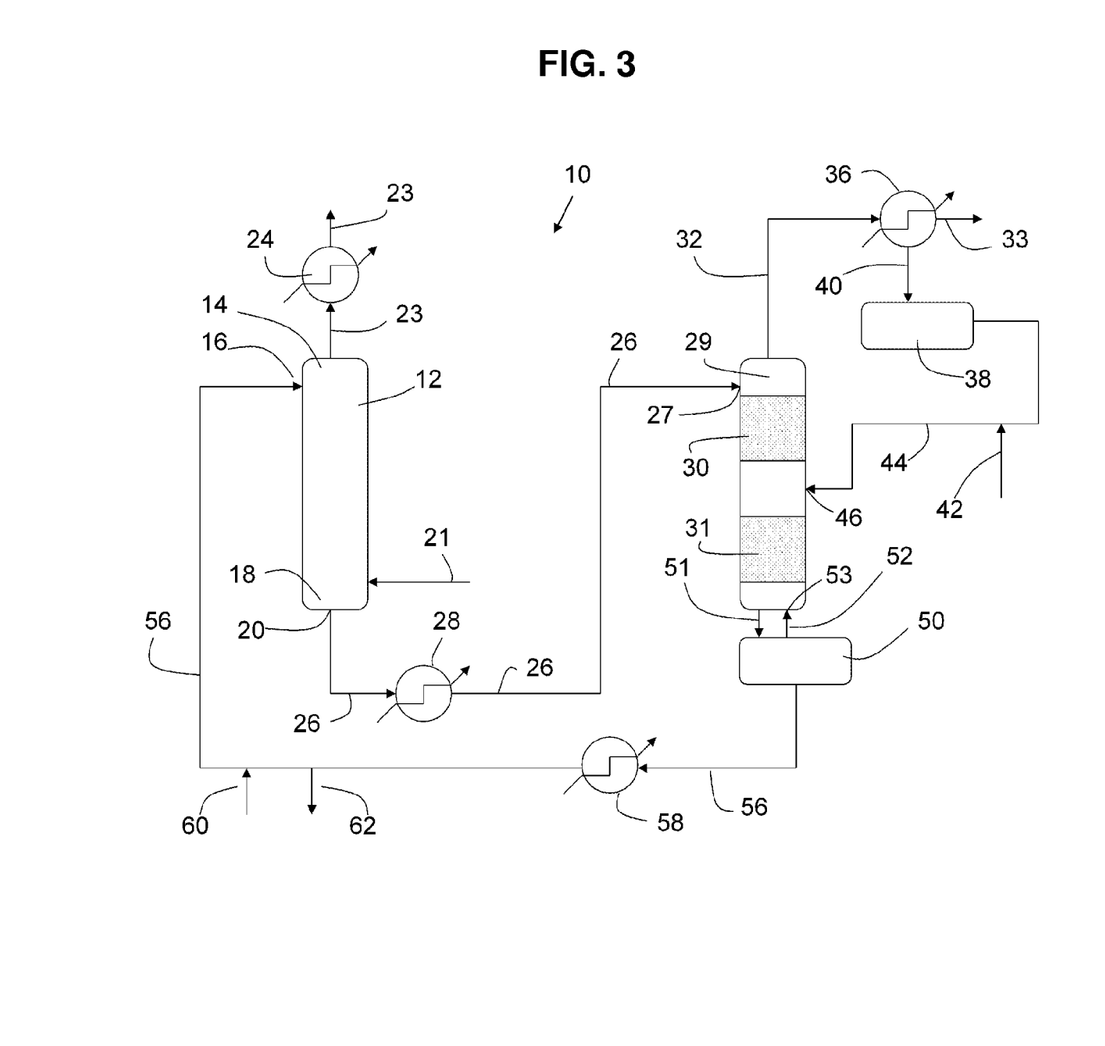
FIG. 3 is a schematic of a second embodiment of a process for treating a fluid stream comprising a regeneration stage according to the present invention.

The present invention differs from the prior art by the return location 46 of the condensed stripper gas from the reflux receiver 38 to the stripper 29, FIGS. 2 and 3. In the present invention, the condensed stripper gas return location 46 must be below the rich solvent inlet feed 27 such that there is a portion of a vapor-liquid contacting section between the rich solvent inlet feed 27 and the return location 46 and (b) above the condensable stripper gas return location 53 from the reboiler such that there is a portion of a vapor-liquid contacting section between the condensed stripper gas return 46 from the reflux receiver and the condensed stripper gas return location 53 from the reboiler.

In one embodiment of the present invention, only a portion of the condensed stripper gas collected in the reflux receiver is returned to the stripper 29 at the return location 46.

In another embodiment of the present invention, all of the condensed stripper gas collected in the reflux receiver is returned to the stripper 29 at the return location 46.

FIG. 2 shows one embodiment of the present invention, wherein the stripper column 29 has one vapor-liquid contacting section 30 and the condensed stripper gas return location 46 is at a location (a) below the rich solvent inlet feed 27 such that there is a portion of the section 30 between rich solvent inlet feed 27 and the return location 46 and (b) above the condensable stripper gas return location 53 from the reboiler with at least a portion of the section 30 between 46 and 53.

FIG. 3 shows another embodiment of the present invention wherein the stripper column 29 has more than one section 30 and 31 and the return location 46 is between the upper section 30 and the lower section 31 and above the return location of the condensed stripper gas from the reboiler 53 such that the lower section 31 is in 46 and 53.

In other embodiments of the present invention (not shown in the Figures) the stripper column 29 comprises multiple sections (i.e., 30, 31, or more) and the condensed stripper gas return location 46 is located anywhere (a) below the rich solvent inlet feed 27 such that there is a portion of a section between rich solvent inlet feed 27 and the return location 46 and (b) above the condensable stripper gas return location 53 from the reboiler such that there is a portion of a section between 46 and 53.

The present invention provides for a more energy efficient and/or cost effective plant and method to treat a fluid stream by lowering the amount of energy required to produce a lean solvent stream from a rich solvent stream. Not to be held to this theory, but we believe that energy is removed from the condenser by reducing the amount of condensable stripping agent that reaches the condenser. Thus, less heat is needed to be transferred and/or less condensable striping gas need to be condensed. Another benefit is that the equipment, i.e., reboiler, condenser, etc. can be smaller.

EXAMPLES

Simulation of a Stripping Column with Condenser Feed Modification.

Two different systems are simulated and compared. In Comparative Example A, the condenser return feed is in the traditional location, feeding the top stage of the stripping column. In Example 1, the condenser return feed is lowered to a point below the top stage.

The simulations are done using a traditional DMPEG stripper configuration using ASPEN software. The hot rich solvent inlet conditions are held constant in the two simulations. The reboiler duty is adjusted to provide a constant concentration of acid gas in the lean solvent. The condenser is set at a temperature of 90° F. The regenerator is setup with 6 theoretical stages, at 20 psia.

As shown in Table 1, the simulation of the present invention, Example 1, performed significantly better than the traditional simulation, Comparative Example A. There is a 32 percent reduction in the amount of energy required by the reboiler to achieve the same lean loading, and a 41 percent reduction in the amount of energy that must be removed by the condenser to achieve the same acid gas temperature.

TABLE 1

| | Comparative Example A | Example 1 |
|---|---|---|
| Rich Solvent Inlet | | |
| Solvent, kmol/s | 0.0582 | 0.0582 |
| Acid Gas, kmol/s | 0.0909 | 0.0909 |
| Water, kmol/s | 0.0087 | 0.0087 |
| Temperature, ° C. | 185 | 185 |
| Lean Solvent Outlet | | |

TABLE 1-continued

|  | Comparative Example A | Example 1 |
|---|---|---|
| Acid Gas, $10^{-6}$ kmol/s | 1.2 | 1.2 |
| Water, kmol/s | 0.0050 | 0.0050 |
| Temperature, °C. | 204.4 | 204.1 |
| *Acid Gas Outlet* | | |
| Acid Gas, kmol/s | 0.0909 | 0.0909 |
| Water, kmol/s | 0.0037 | 0.0037 |
| Temperature, °C. | 32.2 | 32.2 |
| *Stripper Overhead* | | |
| Acid Gas, kmol/s | 0.0910 | 0.0911 |
| Water, kmol/s | 0.0451 | 0.0138 |
| Temperature, °C. | 137.5 | 172.8 |
| *Duties* | | |
| MW, Reboiler | 3.19 | 2.16 |
| MW, Condenser | 2.47 | 1.45 |
| *Energy Reduction* | | |
| %, Reboiler | NA | 32 |
| %, Condenser | NA | 41 |

What is claimed is:

1. A plant for treating a fluid stream comprising a solvent regeneration stage wherein rich solvent comprising one or more contaminant absorbed from the fluid stream is regenerated into lean solvent by stripping away the contaminants said regeneration stage comprises:
   i a stripper column having a top and a bottom and comprising at least one vapor-liquid contacting section, wherein rich solvent comprising contaminants is fed into the stripper column at a location at or above the at least one vapor-liquid contacting section;
   ii a reboiler operationally coupled to the bottom of the stripper column to receive and heat the lean solvent to produce condensable stripping gas which is fed back into the stripper column;
   iii a condenser for condensing condensable stripping gas to condensed stripping gas operationally coupled to the top of the stripper column; and
   iv a reflux receiver to collect condensed stripping gas operationally coupled to the condenser and the stripper column wherein a portion of the collected condensed stripper gas is returned into the stripper column at a location:
      a below the feed location of the rich solvent with at least a portion of the vapor-liquid contacting section between the rich feed location and the condensed stripper gas return location and
      b above the condensable stripping gas return location from the reboiler with at least a portion of a vapor-contacting section between the condensed stripper gas return location and the condensable stripping gas return location from the reboiler.

2. The plant of claim 1 wherein the condensable stripping gas is steam and the condensed stripping gas is water.

3. A method for treating a fluid stream wherein rich solvent comprising one or more contaminant absorbed from the fluid stream is regenerated into lean solvent by stripping away the contaminants comprising the steps of:
   i providing an input stream of rich solvent comprising contaminants to a stripper column having a top and a bottom and comprising at least one vapor-liquid contacting section, wherein rich solvent is fed into the stripper column at a location at or above the at least one vapor-liquid contacting section;
   ii stripping contaminants from the rich solvent by contacting the rich solvent with condensable stripping gas in the stripper column to release the contaminants and form a lean solvent and an overhead admixture of condensable stripping gas and contaminants;
   iii feeding said lean solvent to a reboiler where it is heated to produce additional condensable stripping gas;
   iv introducing said additional condensable stripping gas to the stripper column at a return location whereby it contacts rich solvent comprising contaminants and exits the top of the stripper column as the overhead admixture of condensable stripping gas and contaminants;
   v recovering condensed stripper gas from the overhead admixture by passage thereof through a condenser which condenses condensable stripping gas to condensed stripping gas;
   vi collecting said recovered condensed stripper gas in a reflux receiver for subsequent return to the stripper column;
   vii introducing at least a portion of said recovered condensed stripper gas to the stripper column at a return location which is:
      a below the feed location of the rich solvent with at least a portion of the vapor-liquid contacting section between the rich feed location and the condensed stripper gas return location and
      b above the condensable stripping gas return location from the reboiler with at least a portion of a vapor-contacting section between the condensed stripper gas return location and the condensable stripping gas return location from the reboiler;
   and
   viii passing the lean solvent from the reboiler as regenerated lean solvent.

4. The process of claim 3 wherein the fluid stream is produced by a gassifier or syngas stream comprising hydrogen, carbon dioxide, and carbon monoxide.

5. The process of claim 3 wherein the fluid stream is derived from natural gas and is a gas, a liquid, or mixtures thereof.

6. The process of claim 3 wherein the contaminants include one or more ethane, propane, butanes, pentanes, heavier hydrocarbons, hydrogen, water, carbon monoxide, nitrogen, carbon dioxide, hydrogen sulfide, sulfur dioxide, carbon disulfide, ammonia, hydrogen cyanide, carbonyl sulfide, or mercaptans.

7. The process of claim 3 wherein the solvent is a chemical or physical solvent.

8. The process of claim 3 wherein the solvent is dimethyl ether of polyethylene glycol; propylene carbonate; N-methyl-2-pyrrolidone; methanol; N-acetylmorpholine; N-formylmorpholine; 1,3-dimethyl-3,4,5,6-tetrahydro-2 (1H)-pyrimidinone; methoxytriglycol; or blends thereof.

9. The method of claim 3 wherein the condensable stripping gas is steam and the condensed stripping gas is water.

* * * * *